July 27, 1954 W. W. BEMAN 2,685,083
PHOTOELECTRIC SIGNAL GENERATOR FOR POSITION INDICATORS
Filed June 5, 1951 2 Sheets-Sheet 1
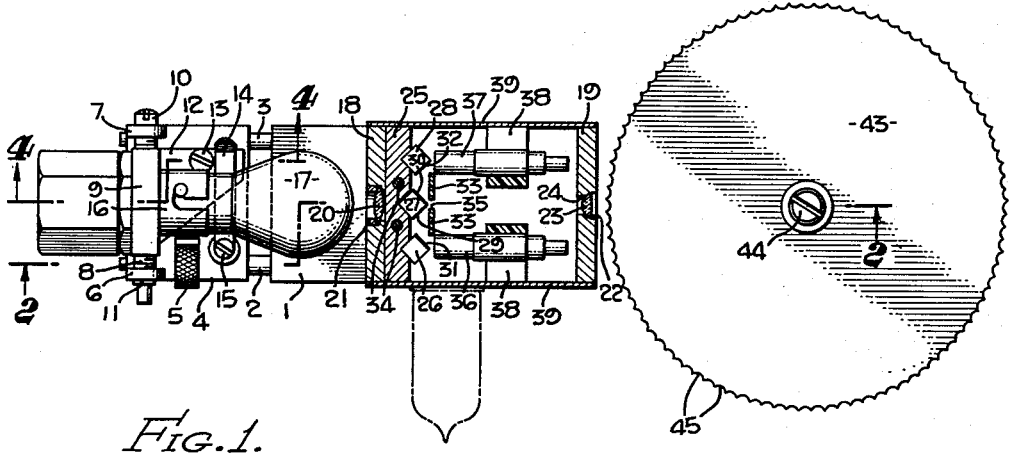
Fig. 1.
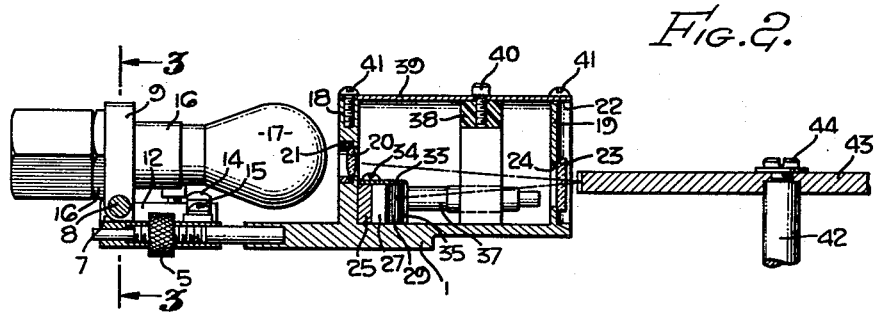
Fig. 2.
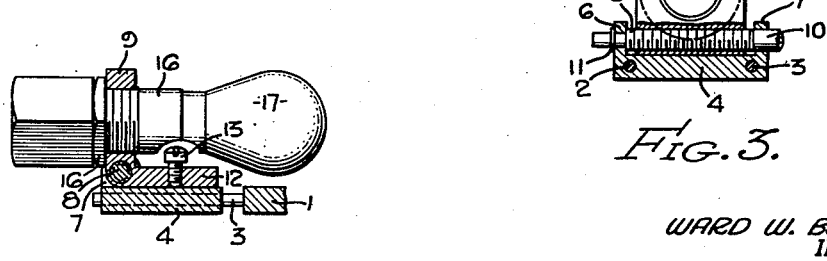
Fig. 4.
Fig. 3.
WARD W. BEMAN
INVENTOR.
BY R. E. Grangue
ATTORNEY July 27, 1954   W. W. BEMAN   2,685,083
PHOTOELECTRIC SIGNAL GENERATOR FOR POSITION INDICATORS
Filed June 5, 1951   2 Sheets-Sheet 2

WARD W. BEMAN
INVENTOR.

BY R. E. Geauque

ATTORNEY

Patented July 27, 1954

2,685,083

UNITED STATES PATENT OFFICE 2,685,083

PHOTOELECTRIC SIGNAL GENERATOR FOR POSITION INDICATORS

Ward W. Beman, Glendale, Calif., assignor to Telecomputing Corporation, Burbank, Calif., a corporation of California Application June 5, 1951, Serial No. 229,972

21 Claims. (Cl. 340—282)

This invention relates to means for developing photoelectric position indicating signals and more particularly to a device for deriving positional information from any movement and supplying such information to a counting circuit. The movement to be followed by the device can be represented by the linear or rotational movement of any element or machine member which is under consideration. The invention relates generally to a position indicating device of the type which is disclosed in U. S. patent application Serial No. 217,978 filed March 28, 1951, by Ward W. Beman and Wyche D. Caldwell and which develops two out-of-phase signals by utilizing a single rotating part to vary the light intensity on two photo-cells.

Prior types of position indicators have included means for translating the movement of any element into rotational movement of a part of the indicator so as to obtain a count of the increments of movement of the element. However, in order for the indicator to receive information concerning the direction of movement of the element, it has been necessary to utilize a mechanical connection with the rotated part of the indicator, which connection must include physical means for providing a certain amount of lag. The use of such a connection imparted undesirable torque loadings on the rotating parts of prior devices and it was necessary to frequently calibrate these indicators.

The present invention overcomes these disadvantages since it utilizes a single rotating part to develop the required directional information. The surface of this rotating part contains a continuous series of grooves which are in the form of concave cylindrical mirrors and a number of these grooves are continually illuminated by a light source. The light reflected from the grooves is focused to form a light pattern having light and dark areas which move during rotation of the surface. Thus, it is possible to develop two out-of-phase photoelectric signals which can be combined in a counter to obtain the required directional information as well as a count of the increments of movement. Since these signals are obtained by the reflection of light from the rotating part of the indicator, there will be no unnecessary torque loadings and it is possible for the rotating part to easily follow changes in the direction of movement of any element.

It is therefore an object of this invention to produce a moving light pattern from which can be derived out-of-phase signals.

A further object of the invention is to provide a series of cylindrical mirrors which rotate in response to the movement of any element and which produce a changing light pattern as the result of this rotation.

A still further object resides in the provisions of means for directing the light reflected from the mirrors so that a light pattern of alternately light and dark areas is produced.

A further object is the provision of means for generating two signals in response to the movement of any mechanism, which signals are out-of-phase in a direction corresponding to the direction of movement of the mechanism.

A still further object of the invention is to provide out-of-phase signals for use by a counting device to give a count corresponding to the exact position of any element or instrument.

These and other objects of the invention not specifically enumerated above will be apparent from the following specifications and drawings in which:

Fig. 1 is a plan view of the invention with part of the casing removed to illustrate the two photo-cells.

Fig. 2 is a vertical sectional view taken along line 2—2 of Fig. 1 showing the relationship of the lenses and mirrors of this invention.

Fig. 3 is a transverse vertical section taken along line 3—3 of Fig. 2 illustrating the transverse adjustment of the light source.

Fig. 4 is a vertical sectional view taken along line 4—4 of Fig. 1.

Figure 5:
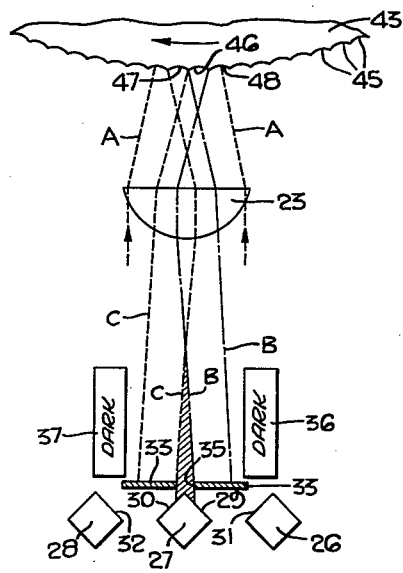
Fig. 5 illustrates the position of the reflecting grooves which results in equal low level illuminations of both photo-cells.

The embodiment of the present invention chosen for illustration is comprised of a base plate 1 which has openings in one end to receive rods 2 and 3. These rods project through an auxiliary plate 4 so as to slidably mount the plate 4. A considerable portion of rod 2 is larger in diameter than rod 3 and this enlarged portion has a threaded area which cooperates with nut 5 located in an opening in side of plate 4. By rotating nut 5, the position of plate 4 with respect to base plate 1 can be adjusted.

The projections 6 and 7 from plate 4 have openings for receiving the ends of rod 8 which is threaded through an opening at the bottom of upright member 9. One end of rod 8 has a screw head 10 while the other end is grooved to receive a lock washer 11 for retaining the rod 8 in position. By rotating rod 8, the member 9 can be moved back and forth across the plate 4 in order to adjust its position. A member 12 is formed integrally with and projects at right angles from member 9 along the surface of plate 4. The member 12 carries a set screw 13 which has its end continuously held in contact with plate 4 by means of the leaf spring 14. The spring 14 is pivotally mounted on screw 15, threaded into plate 4, so that it can be moved out of contact with member 12. By rotating screw 13, the member 9 can be tilted into any desired position.

A light socket 16 is mounted in an opening in member 9 and carries a light source 17. Because of the adjustments which have been described for positioning member 9, it is obvious that the light source 17 can be moved with respect to base plate 1 and can be moved transversely of plate 4 or rotated with respect to plate 4.

Two extensions 18 and 19 project at right angles from plate 1 and are spaced apart. The extension 18 has a circular opening at its center in which is mounted the double convex lens 20 by means of a sleeve 21. The extension 19 has a cylindrical groove 22 which receives a cylindrical lens 23 and this lens is positioned to cover opening 24 in extension 19. A reflector mounting member 25 is positioned adjacent extension 18 and contains three spaced grooves for receiving one edge respectively of square reflectors 26, 27 and 28. The center reflector 27 has mirrored sides 29 and 30 while only sides 31 and 32 of reflectors 26 and 28 respectively need be mirrored. Since all three of the reflectors are square and are mounted with their diagonals perpendicular to member 25, it is apparent that mirrored surfaces 29 and 31 and mirrored surfaces 30 and 32 are perpendicular to each other.

An L-shaped light shield 33 has one side overlapping member 25 and screws 34 secure both the light shield and member 25 to base plate 1. The other side of the shield covers reflector 27 except for the fact that slit 35 is positioned in the shield to permit the illumination of small equal areas of both surfaces 29 and 30.

A pair of photo-cells 36 and 37 are positioned in front of mirrored surfaces 31 and 32 respectively with their axes at 45 degrees to these surfaces. The photo-cells are mounted in a U-shaped frame 38 which has an opening at each side for receiving one of the photo-cells. This frame is secured by means of screws 40 to the cover 39 which completely encloses the area bounded by extensions 18 and 19. Screws 41 serve to secure the cover 39 to both these extensions and an amplifier tube is secured to one side of the cover as illustrated in Fig. 1.

The parts of the invention which are rotated in response to the movement of any element being considered are designated as shaft 42 and disk 43, secured to the shaft by means of screw 44. The disk has a series of adjacent cylindrical grooves 45 extending completely around its periphery and the edge of the disk is positioned directly in front of the lens 23 so that the grooves can reflect light through opening 24. The grooves 45 shown in Figs. 1 and 2 are considerably larger than if they had been drawn more nearly to their relative size as in Figs. 5 and 6.

The broken line of Fig. 2 illustrates the path followed by light emanating from source 17. This light is directed by lenses 20 and 23 onto the grooves 45 of disk 43 and is then reflected by the grooves back through lens 23, which serves to direct the reflected light to the light shield 33. The portion of this reflected light which passes through slit 35 will be directed to both of the photo-cells 36 and 37 by reflector 27. The amount of light received by each photo-cell will be determined by the light pattern covering slit 35 since reflector 27 serves to project one-half of this light pattern to each photo-cell. For instance, if the light pattern at slit 35 is such that the surface 29 receives more light than surface 30, then the photo-cell 36 will be energized to a greater extent than photo-cell 37.

Figure 6:
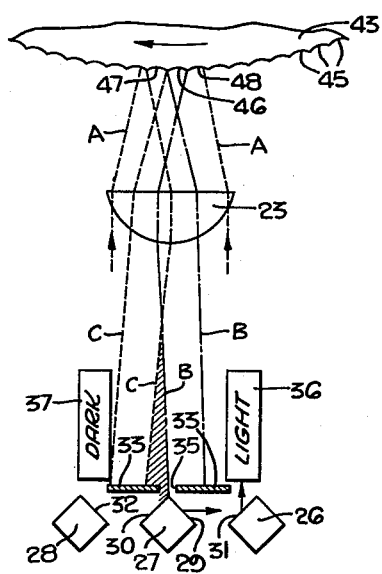
Fig. 6 represents the position of the reflecting groove which results in unequal illumination of the photo-cells.

A portion of the light pattern developed by lens 23 at shield 33 is illustrated in Figs. 5 and 6. The incoming light from source 17 is focused by lens 23 into a beam defined by the dotted lines A. This beam is of sufficient width to illuminate a number of the reflecting grooves 45 of disk 43. All of the light reflected from the grooves positioned at the center of the beam defined by lines A will pass back through lens 23 while only a portion (not shown) of the light reflected from the grooves at the edge of the beam will strike lens 23. The width and position of the beam can be varied by adjusting the position of source 17 in the manner previously described. Only the light reflected from the two centermost grooves is shown in Figs. 5 and 6 since the light reflected from other grooves will not strike slit 35 and will therefore have no effect on the illumination of the photo-cells.

In Fig. 5, the two center reflecting grooves 46 and 47 are positioned on opposite sides of the center line of slit 35 and lens 23. The groove 46 produces a pattern defined by lines B while groove 47 produces the pattern defined by lines C. It is noted that these two patterns diverge leaving a dark area at slit 35 equal in width to slit 35. Actually this dark area is not of uniform intensity but is darker at its center and lighter at its edges due in part to aberration of the lens 23. Therefore, while both photo-cells are labeled as dark, each photo-cell will be receiving a small amount of light from the edges of the dark pattern covering the slit 35 and since this pattern is symmetrical about the slit, each photo-cell will be receiving an equal amount of low-level light.

During the operation of the invention, the disk 43 can be rotated in either direction depending upon the movement being followed. If the disk rotates in the direction of the arrows in Figs. 5 and 6, the grooves 46 and 47 will move to the left and the light pattern from groove 46 will move to the left and begin to cover slit 35. In Fig. 6, the edge of the light pattern from groove 46 has moved half way across the slit and is reflected by surfaces 29 and 31 into photo-cell 36 while the edge of the dark area is reflected by surfaces 30 and 32 into photo-cell 37. It is therefore apparent that photo-cell 36 will be receiving more light than photo-cell 37.

Upon further rotation of the disk 43, the groove 46 will come directly in line with slit 35 and the light pattern for this groove defined by lines B will be narrowed by lens 23 so that it will just cover the area of the slit 35. Under this condition, the intensity of light across the slit will vary and will be greatest at the center of the pattern which will be located at the center of the slit. Both photo-cells will receive an equal amount of high-level light from reflector 27. Upon further rotation of the disk 43, the light pattern of groove 46 will move past the slit 35 and, together with the light pattern of the following groove 48, will produce another dark area over the slit 35.

Figure 7:
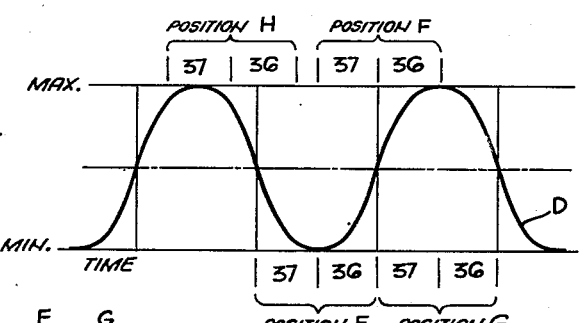
Fig. 7 is a graphical illustration of the variation in intensity of light over the area of the illuminated slit during rotation of the reflecting grooves.

From the above discussion, it is apparent that the intensity of light over the area of slit 35 during rotation of disk 43 will vary in the manner illustrated by curve D of Fig. 7. When the light pattern corresponds to that of Fig. 5, the light intensity over slit 35 will correspond to that of position E of Fig. 7 in which the total width of the slit is divided into the effective areas for photo-cells 36 and 37. After the disk 43 rotates into the position of Fig. 6, the position F illustrates the light intensity across slit 35 and also the amount of light received by each photo-cell. Position G shows the intensity at slit 35 when the slit receives all the light from reflector groove 46, while position H illustrates the intensity across slit 35 when the photo-cell 37 receives maximum light.

Figure 8:
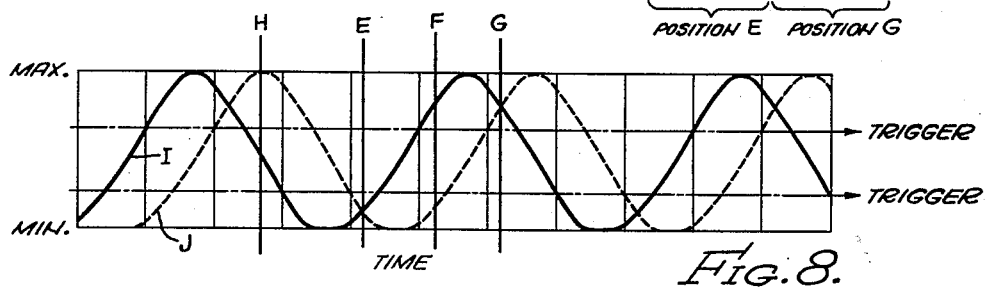
Fig. 8 represents the output curves for the two photo-cells and the phase relationship between the two curves.

Because of the movement of the light pattern across slit 35, it is apparent from Fig. 8 that the output of photo-cell 36, shown as curve I, leads the output photo-cell 37, shown as curve J, when the disk 43 rotates in the clockwise direction. The lines dawn through curves I and J and designated as E, F, G and H indicate the simultaneous output of each photo-cell corresponding to the positions E, F, G and H respectively which are shown in Fig. 7. At position E both photo-cells have equal low-level output while at position G both photo-cells have equal high-level output. The line F, corresponding to position F, illustrates the condition under which photo-cell 36 receives substantially more light than photo-cell 37 and line H, corresponding to position H, illustrates a maximum output from photo-cell 37 with a lower output from photo-cell 36.

Figure 9:
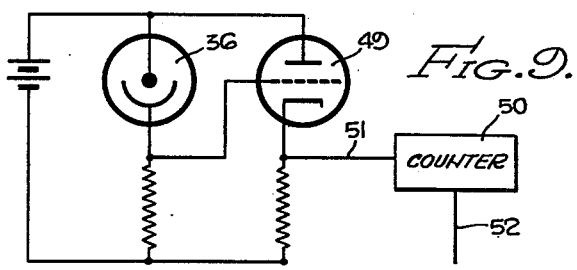
Fig. 9 shows the circuit for connecting the output of each photo-cell to a counter through an amplification stage.

If the direction of rotation of disk 43 is reversed, the output of photo-cell 37 will lead the output of photo-cell 36 and the curves of Fig. 8 will be reversed. Since there is always a difference in phase of less than 180 degrees between the outputs of the photo-cells, regardless of the direction of rotation, it is possible to use the output of one of the photo-cells to count increments of movement and to combine the outputs of both photo-cells to obtain directional information. Any suitable type of counter presently in use can be utilized to give this information after the outputs of the photo-cells are amplified sufficiently. In Fig. 9, the photo-cell 36 is shown connected to the grid of amplifier 49 and the output of the amplifier is connected to the counter 50 by line 51. The output of photo-cell 37 is likewise amplified and connected to counter 50 by means of line 52.

The counter 50 can be of the type disclosed in U. S. patent application Serial No. 217,978 filed March 28, 1951, by Ward W. Beman and Wyche D. Caldwell which contains a pair of triggers which produce positive and negative going pulses and high and low voltage levels from the output of each of the photo-cells. The trigger levels suitable for these triggers are shown applied to the unamplified curves of Fig. 8. The counter contains a number of electrical gates which convert the trigger outputs into a count of increments of movement and a direction signal indicating the direction of movement.

The device incorporating this invention makes it possible to obtain a continuous indication of the position of any element or member by simply converting this movement into rotational movement of disk 43. Since the out-of-phase signals required by the counter to give this information are developed by light reflected from disk 43, there is no external load or drag placed on the disk which would jeopardize the operation and calibration of the device. The size of the reflecting grooves and the number of grooves illuminated during rotation can be varied so long as a suitable light pattern results and the relative sizes and intensities of the light and dark areas of the reflected light pattern can also be varied. Also, the light pattern across slit 35 can be divided into more than two parts to obtain more than two out-of-phase signals if so desired. It is apparent that the use of the generated signals is not limited to indicating means since the signals can be utilized in a number of other ways, such as in connection with servo mechanisms. While the invention has been described as incorporating photo-cells to produce signals, it is contemplated that any other suitable type of light-sensitive device can be utilized for this purpose. Various other modifications are contemplated and may obviously be resorted to by those skilled in the art without departing from the spirit and scope of the invention, as hereinafter defined by the appended claims.

What is claimed is:

1. A signal generator responsive to any movement, comprising reflecting means movable in response to said movement, means for illuminating a single portion of said reflecting means and means for obtaining out-of-phase signals from the light reflected from said reflecting means.

2. A signal generator responsive to any movement, comprising means rotated in response to said movement and having a series of reflecting grooves around its periphery, means for continuously illuminating a single portion of said groove on said rotatable means, means for directing the light reflected from said grooves into a light pattern having light and dark areas, and means for dividing said light pattern to produce two out-of-phase signals.

3. In a signal generator responsive to any movement, means movable in response to said movement, a series of reflectors mounted on said movable means, stationary means for simultaneously illuminating a number of adjacent reflectors during movement of said movable means, and lens means for forming a changing light pattern from the light reflected from said illuminated reflectors.

4. In a signal generator responsive to any movement, means movable in response to said movement, a continuous series of reflectors mounted on said movable means, a stationary light source directed against said movable member of sufficient width to continually illuminate several consecutive reflectors during movement of said reflectors past said source, lens means for producing a cyclic light pattern from light reflected from said illuminated reflectors during their movement, said light pattern completing one cycle for each reflector that moves past said source.

5. In a signal generator as defined by claim 4, a light shield containing a slit positioned within said pattern, said lens means producing a dark area and a light area over said slit during each cycle of said light pattern.

6. In a signal generator as defined in claim 5 wherein said lens means produces said dark area by diverging the light of two adjacent reflectors away from said slit and produces said light area by directing the light of one of said reflectors to said slit.

7. In a signal generator responsive to the movement of any element, a circular disk rotated by said element and having a series of adjacent cylindrical reflecting grooves completely around its periphery, a light source, a lens for focusing said light source against said grooves in order to illuminate at least a part of two adjacent grooves at all times, said lens also focusing the light reflected from said grooves into a light pattern, a light shield positioned within said pattern and containing a slit in line with the center of said lens, said lens forming alternate light and dark areas at said slit by moving the light from each groove across said slit during movement of said groove through the illuminated region.

8. A signal generator responsive to any movement comprising reflector means movable in response to said movement, means for illuminating said reflector means, means for directing the reflected light to produce alternate light and dark illumination at a given position during movement of said reflector means, and means positioned at said position to divide the illumination between more than one photo-cell to produce out-of-phase signals.

9. In a signal generator responsive to the movement of any element, means movable with said element for producing a moving light pattern having areas of high-level and low-level light, stationary means positioned within said pattern for passing a limited portion of said pattern, and means for dividing said passed portion between two light sensitive devices to produce signals which are out-of-phase.

10. A signal generator responsive to any movement comprising reflector means movable in response to said movement, means for illuminating said reflector means, means for directing the light reflected from said reflector means to produce alternate areas of high-level and low-level light which move past a given position during movement of said reflector means, means located at said position for passing a limited portion of said pattern and means for dividing said passed portion between two photocells to produce signals which are out-of-phase by approximately 90 degrees.

11. In a signal generator responsive to the movement of any element, means movable with said element for producing a moving light pattern having areas of high-level and low-level light, stationary means positioned within said pattern for passing a limited portion of said pattern, means for dividing said passed portion and directing different parts of the passed portion to two light sensitive devices so that one device continually receives a different amount of light than the other device during movement of the pattern, said light sensitive devices producing signals in response to the light received which are out-of-phase.

12. A signal generator responsive to any movement comprising reflector means movable in response to said movement, means for illuminating said reflector means, means for directing the reflected light to produce alternate areas of high-level and low-level light which move past a given position during movement of said reflector means, said areas of high-level and low-level light being approximately equal in width, a light shield having a slit located at said position which slit is approximately equal in width to the width of said high-level and low-level light areas, and means positioned to reflect the light passing each half of said slit to two separate photocells in order to derive signals from said photocells which are out-of-phase.

13. In a signal generator responsive to the movement of any element, means movable with said element, a plurality of reflectors carried by said movable means, a stationary light source for continually illuminating a part of said reflectors during movement of said reflectors past said light source, lens means for focusing the light reflected from said illuminated reflectors during movement past said light source to produce a moving light pattern having areas of high-level and low-level light, stationary slit means positioned in said pattern for passing a limited portion of said pattern during movement of the pattern past said slit, and means for dividing said passed portion between two photocells to produce signals which are out-of-phase.

14. In a signal generator responsive to the movement of any element, means movable with said element for producing a moving light pattern have alternate areas of high-level and low-level light, means positioned within said pattern for passing a limited portion of said pattern, and means for dividing said passed portion between two photocells to produce signals which are out of phase by approximately 90 degrees.

15. An indicator for determining the position of any movement, comprising reflecting means movable in response to said movement, means for illuminating a single portion of said reflecting means, means for obtaining out-of-phase signals from the light reflected from said reflecting means and counter means operated in response to said signals to give a digital count of position.

16. An indicator for following the position of any movement, comprising means movable in response to said movement, a series of reflectors mounted on said movable means, stationary means for simultaneously illuminating a number of adjacent reflectors during movement of said movable means, lens means for forming a changing light pattern from the light reflected from said illuminated reflectors, a light shield positioned across said pattern and containing a slit to pass a portion of said pattern, means for dividing said passed portion between two photocells to produce two out-of-phase signals and a counter for combining said signals to indicate position.

17. In a position indicator for continuously determining the position of any element, a circular disk rotated by said element and having a series of adjacent cylindrical reflecting grooves completely around its periphery, a light source, a lens for focusing said light source against said grooves in order to illuminate at least a part of two adjacent grooves at all times, said lens also focusing the light reflected from said grooves into a light pattern, a light shield positioned within said pattern and containing a slit in line with the center of said lens, said lens forming alternate light and dark areas at said slit by moving the light from each groove across said slit during movement of said groove through the illuminated region, means for dividing the light passing through said slit between two photo-cells to produce two out-of-phase signals, and counter means for combining said signals to indicate position.

18. In a signal generator operative in response to any movement, reflector means movable in response to said movement, said reflector means being comprised of a continuous series of reflecting elements positioned adjacent one another, means for illuminating a number of said adjacent elements, and means for directing the reflected light to produce alternate light and dark illumination at a given position during movement of said reflector means.

19. A signal generator responsive to any movement, comprising reflector means movable in response to said movement, means for illuminating said reflector means, means for directing the reflected light to produce alternate light and dark illumination at a given position during movement of said reflector means, and means positioned at said position to divide the illumination between more than one light sensitive device to produce out-of-phase signals.

20. An indicator for determining the position of any movement, comprising reflector means movable in response to said movement, means for illuminating said reflector means, means for directing the reflected light to produce alternate light and dark illumination at a given position during movement of said reflector means, means positioned at said position to divide the illumination between more than one light sensitive device to produce out-of-phase signals, and counter means operative in response to said signals to indicate position.

21. A signal generator responsive to any movement, comprising means movable in response to said movement and having a series of reflecting elements, means for continuously illuminating a single portion of said elements, means for directing the light reflected from said elements into a light pattern having light and dark areas, and means for dividing said light pattern to produce two out-of-phase signals during movement of said movable means.

References Cited in the file of this patent

UNITED STATES PATENTS

| Number | Name | Date |
| --- | --- | --- |
| 1,672,671 | Young | June 6, 1928 |
| 1,721,375 | Koning | July 16, 1929 |
| 1,878,658 | Aronoff | Sept. 20, 1932 |
| 2,442,240 | Hooker et al. | May 25, 1948 |
| 2,537,427 | Seid et al. | Jan. 9, 1951 |